United States Patent
Jiang et al.

(10) Patent No.: US 10,824,843 B2
(45) Date of Patent: Nov. 3, 2020

(54) TERMINAL HAVING FINGERPRINT IDENTIFICATION FUNCTION

(71) Applicant: Xiaomi Inc., Beijing (CN)

(72) Inventors: Zhongsheng Jiang, Beijing (CN); Kun Yang, Beijing (CN); Jun Tao, Beijing (CN)

(73) Assignee: XIAOMI INC., Beijing (CN)

( * ) Notice: Subject to any disclaimer, the term of this patent is extended or adjusted under 35 U.S.C. 154(b) by 42 days.

(21) Appl. No.: 15/346,741

(22) Filed: Nov. 9, 2016

(65) Prior Publication Data
US 2017/0132449 A1    May 11, 2017

(30) Foreign Application Priority Data
Nov. 9, 2015    (CN) .......................... 2015 1 0755785

(51) Int. Cl.
*G06K 9/00*        (2006.01)
*G06F 21/32*       (2013.01)
(Continued)

(52) U.S. Cl.
CPC ....... *G06K 9/00087* (2013.01); *G06F 1/1626* (2013.01); *G06F 1/1684* (2013.01);
(Continued)

(58) Field of Classification Search
CPC .... G06F 3/04883; G06F 21/32; G06F 3/0416; G06F 3/04886; G06F 2203/04104;
(Continued)

(56) References Cited

U.S. PATENT DOCUMENTS 6,766,040 B1 *   7/2004   Catalano ............ G06K 9/00067
                                                    340/5.53
9,230,150 B1 *   1/2016   Merrell ................ G06K 9/0002
(Continued)

FOREIGN PATENT DOCUMENTS

CN    102508591 A    6/2012
CN    103942481 A    7/2014
(Continued)

OTHER PUBLICATIONS

Extended European Search Report EP16197763A1.
(Continued)

*Primary Examiner* — Shaghayegh Azima
(74) *Attorney, Agent, or Firm* — Jun He Law Offices P.C.; James J. Zhu

(57) ABSTRACT

A terminal having a fingerprint identification function is provided. The terminal includes: a body having an outside surface; a screen disposed on the outside surface; a fingerprint detection component disposed on the outside surface; and a processor disposed inside the body and electrically connected to the screen and the fingerprint identification component; the processor is configured to turn on the fingerprint detection component to obtain fingerprint data detected by the fingerprint detection component when a touch signal on the screen is received and to execute the preset control instruction if the fingerprint data matches pre-stored reference fingerprint data.

6 Claims, 3 Drawing Sheets

US 10,824,843 B2
Page 2

(51) Int. Cl.
*G06F 1/16* (2006.01)
*G06F 3/041* (2006.01)
*G06F 3/0488* (2013.01)
*G06K 9/46* (2006.01)

(52) U.S. Cl.
CPC ........ *G06F 3/0416* (2013.01); *G06F 3/04883* (2013.01); *G06F 21/32* (2013.01); *G06K 9/00013* (2013.01); *G06K 9/4604* (2013.01); *G06F 2203/04104* (2013.01)

(58) Field of Classification Search
CPC ... G06F 21/31; G06F 1/3215; G06K 9/00013; G06K 9/00087; G06K 9/4604
See application file for complete search history.

(56) References Cited

U.S. PATENT DOCUMENTS

| | | | | |
|---|---|---|---|---|
| 9,836,637 | B2* | 12/2017 | Merrell | G06F 21/32 |
| 2004/0130335 | A1* | 7/2004 | Shimizu | G06K 9/0002 |
| | | | | 324/661 |
| 2005/0253817 | A1* | 11/2005 | Rytivaara | G06F 21/36 |
| | | | | 345/173 |
| 2008/0030302 | A1* | 2/2008 | Franza | G06K 9/00006 |
| | | | | 340/5.83 |
| 2009/0224874 | A1* | 9/2009 | Dewar | G06F 21/36 |
| | | | | 340/5.53 |
| 2011/0032206 | A1* | 2/2011 | Kitamura | G06T 1/0021 |
| | | | | 345/173 |
| 2012/0071149 | A1* | 3/2012 | Bandyopadhyay | G06F 1/1643 |
| | | | | 455/418 |
| 2012/0090757 | A1* | 4/2012 | Buchan | G06F 21/83 |
| | | | | 156/60 |
| 2014/0093143 | A1* | 4/2014 | Thompson | G06F 3/03547 |
| | | | | 382/124 |
| 2014/0181962 | A1* | 6/2014 | Seo | G06F 21/32 |
| | | | | 726/19 |
| 2015/0070079 | A1* | 3/2015 | Yang | G06K 9/0002 |
| | | | | 327/517 |
| 2015/0070137 | A1* | 3/2015 | Minteer | G06K 9/209 |
| | | | | 340/5.83 |
| 2015/0139511 | A1* | 5/2015 | Yoon | G06K 9/0002 |
| | | | | 382/124 |
| 2015/0177972 | A1* | 6/2015 | Tsai | G06F 3/04883 |
| | | | | 715/771 |
| 2016/0034742 | A1* | 2/2016 | Kim | G06F 1/163 |
| | | | | 382/124 |
| 2016/0042166 | A1* | 2/2016 | Kang | G06F 3/04886 |
| | | | | 726/7 |
| 2016/0077731 | A1* | 3/2016 | Fukui | G06F 3/0488 |
| | | | | 345/173 |
| 2016/0109999 | A1* | 4/2016 | Lee | G06F 3/0412 |
| | | | | 345/173 |
| 2016/0148037 | A1* | 5/2016 | Baek | G06F 3/0416 |
| | | | | 345/174 |
| 2016/0171281 | A1* | 6/2016 | Park | G06K 9/00087 |
| | | | | 382/124 |
| 2016/0180145 | A1* | 6/2016 | Setterberg | G06K 9/00926 |
| | | | | 382/124 |
| 2016/0188023 | A1* | 6/2016 | Chang | G09G 5/003 |
| | | | | 345/173 |
| 2016/0342780 | A1* | 11/2016 | Lee | G06F 21/32 |
| 2016/0343147 | A1* | 11/2016 | Nukaga | G06K 9/4671 |
| 2016/0371691 | A1* | 12/2016 | Kang | G06K 9/00013 |
| 2016/0379039 | A1* | 12/2016 | Dagan | G06K 9/00006 |
| | | | | 382/124 |
| 2017/0032169 | A1* | 2/2017 | Pi | G06K 9/00906 |
| 2017/0116453 | A1* | 4/2017 | Ganapathi | G06K 9/0004 |
| 2017/0116455 | A1* | 4/2017 | Alameh | G06F 1/3215 |
| 2017/0192482 | A1* | 7/2017 | Merrell | G06F 1/3215 |
| 2017/0308732 | A1* | 10/2017 | Wang | G06K 9/00087 |
| 2018/0365477 | A1* | 12/2018 | Seol | G06F 21/32 |

FOREIGN PATENT DOCUMENTS

| | | |
|---|---|---|
| CN | 104008319 A | 8/2014 |
| CN | 104318222 A | 1/2015 |
| CN | 104537365 A | 4/2015 |
| CN | 104699507 A | 6/2015 |
| CN | 104951159 A | 9/2015 |
| CN | 105388993 A | 3/2016 |
| EP | 2273351 A1 | 1/2011 |
| WO | WO2001059692 * | 1/2001 |

OTHER PUBLICATIONS

International Search Report of PCT/CN2016/100818.
International Search Report for International application No. PCT/CN2016/100818, dated Dec. 28, 2016.

* cited by examiner

TERMINAL HAVING FINGERPRINT IDENTIFICATION FUNCTION

CROSS-REFERENCE TO RELATED APPLICATIONS

The present application is based upon and claims priority to Chinese Patent Application No. 201510755785.8, filed Nov. 9, 2015, the entire contents of which are incorporated herein by reference.

TECHNICAL FIELD

The present disclosure generally relates to computer technologies, and more particularly, to a terminal having a fingerprint identification function.

BACKGROUND

With continuous development of computer technologies, terminals such as mobile phones and the like, have become one of the indispensable tools in people's daily life, and more and more novel functions of terminals bring great convenience to people. During the use of terminals, in order to guarantee the safety of user information, terminals are usually provided with a fingerprint identification function to execute safety-critical operations on the terminals, such as unlock or payment operations, and the like.

Typically, a fingerprint detection component of a terminal is configured to detect fingerprint data. When the terminal is in a turn-on state, the fingerprint detection component is turned on. If a user wants to unlock the screen, he/she may put a finger, fingerprint of which is pre-stored, on the fingerprint detection component, and the fingerprint detection component detects the current fingerprint data. If the current detected fingerprint data matches the pre-stored fingerprint data, the terminal execute screen unlock.

SUMMARY

Embodiments of the present disclosure provide a terminal having a fingerprint identification function.

According to an aspect of embodiments of the present disclosure, there is provided a terminal having a function of identifying fingerprint. The terminal includes: a body having an outside surface; a screen disposed on the outside surface; a fingerprint detection component disposed on the outside surface; a processor disposed inside the body and electrically connected to the screen and the fingerprint detection component; wherein the processor is configured to turn on the fingerprint detection component to obtain fingerprint data detected by the fingerprint detection component when a touch signal on the screen is received, and execute a preset control instruction if the fingerprint data matches pre-stored reference fingerprint data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

LISTING OF REFERENCE SIGNS

| 1-body | 2-screen |
|---|---|
| 21-touch detection unit | 3-fingerprint detection component |
| 4-processor | |

Exemplary embodiments of the present disclosure are shown in the above drawings, and detailed description will be provided later. These drawings and literal descriptions are not intended to restrict the scope of the present disclosure in any way, but to convey the conception of the present disclosure to one of ordinary skill in this art by exemplary embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
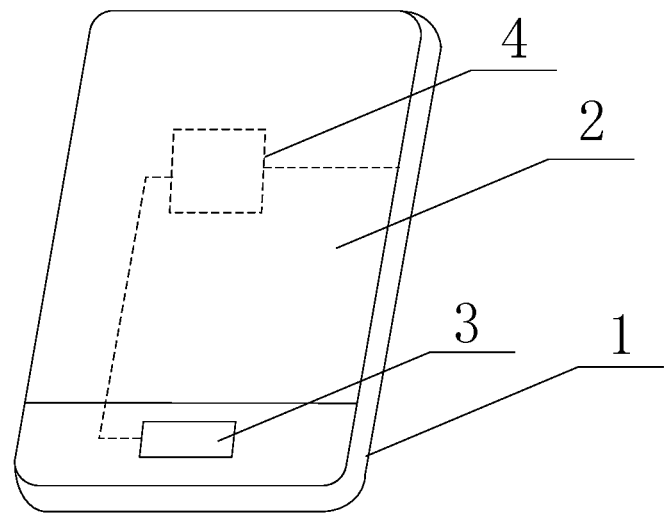
FIG. 1 is a schematic diagram showing a terminal having a fingerprint identification function according to an exemplary embodiment.

An exemplary embodiment of the present disclosure provides a terminal having a fingerprint identification function. As shown in FIG. 1, the terminal includes a body 1, a screen 2, a fingerprint detection component 3 and a processor 4.

The screen 2 and the fingerprint detection component 3 are disposed on an outside surface of the body 1, and the processor 4 is disposed inside the body 1 and electrically connected to the screen 2 and the fingerprint identification component 3. The processor 4 is configured to turn on the fingerprint detection component 3 to obtain fingerprint data detected by the fingerprint detection component 3 when a touch signal on the screen 2 is received, and if the fingerprint data matches pre-stored reference fingerprint data, execute a preset control instruction.

In this way, a touch on the screen will trigger to turn on the fingerprint detection component, and it is not needed for the fingerprint detection component with high power consumption to be in the turn-on state all the time, and thereby the power consumption of the terminal can be reduced.

Another exemplary embodiment of the present disclosure provides a terminal having a fingerprint identification function. As shown in FIG. 1, the terminal includes a body 1, a screen 2, a fingerprint detection component 3 and a processor 4. The screen 2 and the fingerprint detection component 3 are disposed on an outside surface of the body 1, and the processor 4 is disposed inside the body 1 and electrically connected to the screen 2 and the fingerprint identification component 3. The processor 4 is configured to turn on the fingerprint detection component 3 to obtain fingerprint data detected by the fingerprint detection component 3 when a touch signal on the screen 2 is received, and if the fingerprint data matches pre-stored reference fingerprint data, execute a preset control instruction.

In the embodiment, the terminal includes the body 1, the screen 2, the fingerprint detection component 3 and the processor 4. The screen 2 and the fingerprint detection component 3 can be disposed on an outside surface of the body 1 (for example, the front surface of the body 1). The processor 4 can be a central processing unit of the terminal and can be disposed inside the body 1 and electrically connected to the screen 2 and the fingerprint detection component 3. In the case where the finger detection component 3 is not disposed on an edge of the screen 2, if a user touches the screen 2 and a touch signal is detected by the screen 2, the screen 2 may send the touch signal to the processor 4. When the processor 4 receives the touch signal on the screen 2, the processor 4 sends a start instruction to the finger detection component 3. After the fingerprint detection component 3 receives the start instruction, the fingerprint detection component 3 turns on and enters into a working mode. The user can put his/her finger on a region over the fingerprint detection component 3, and then the fingerprint detection component 3 starts to detect fingerprint data and sends the fingerprint data to the processor 4. In the case where the fingerprint detection component 3 is disposed at the lower edge of the screen 2, the user can put his/her finger on a region over the fingerprint detection component 3, and this touch on the screen 2 can trigger to turn on the fingerprint detection component 3 and also cause the fingerprint detection component 3 to detect fingerprint data. Detailed procedure will be described later.

Reference fingerprint data may be pre-stored in the processor 4. A user may open a fingerprint setting interface of the terminal and taps a fingerprint setting option on the fingerprint setting interface of the terminal. Then, the terminal may receive the tap instruction and control the fingerprint detection component 3 to be in an on-state. The fingerprint detection component 3 may send detected fingerprint data to the processor 4, and the processor 4 may store the fingerprint data as the reference fingerprint data. The terminal may detect the fingerprint of the user for multiple times and the fingerprint detection component 3 may determine an average of the fingerprint data detected for multiple times and send the average to the processor 4. The processor 4 receives and stores the average of the fingerprint data, so that the average of the fingerprint data is taken as the reference fingerprint data. Upon receipt of fingerprint data detected by the fingerprint detection component 3, the processor may obtain the pre-stored reference fingerprint data.

The processor 4 may compare the obtained fingerprint data with the pre-stored reference fingerprint data, and determine the similarity between the obtained fingerprint data and the pre-stored reference fingerprint data. If the similarity between the obtained fingerprint data and the reference fingerprint data is within a preset similarity range, the processor 4 may execute a preset control instruction. The preset control instruction may instruct the terminal to perform corresponding operations according to the current state of the terminal. For example, if the terminal is in a screen lock state, the processor 4 executes a screen unlock process; if the terminal is under a payment state, the processor 4 executes the payment process, and the like. For example, if the processor 4 determines that the similarity between the obtained fingerprint data and the reference fingerprint data is within the preset similarity range and the processor 4 detects that the current state of terminal is a screen lock state, the processor can execute the screen unlock process.

According to an embodiment, the fingerprint detection component 3 can be disposed adjacent to an edge of the screen 2.

In the embodiment, the fingerprint detection component 3 is disposed adjacent to an edge of the screen 2 so as to bring convenience to user's operations.

According to an embodiment, the fingerprint detection component 3 can be disposed adjacent to a lower edge of the screen 2.

Figure 2:
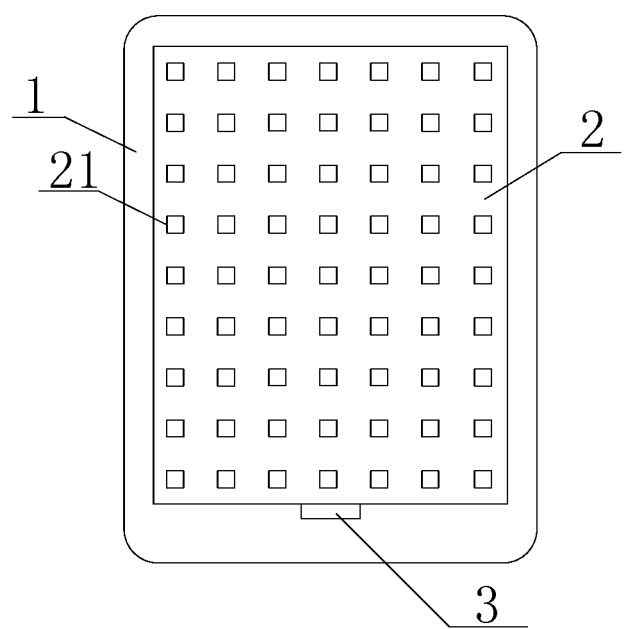
FIG. 2 is a schematic diagram showing a terminal having a fingerprint identification function according to an exemplary embodiment.

In an embodiment, as shown in FIG. 2, the fingerprint detection component 3 can be disposed adjacent to a lower edge of the screen 2, for example, in the central position of the lower edge of the screen 2. This can bring convenience to user's operation. When a user puts his/her finger on a region over the fingerprint detection component 3, a part of the finger may touch the screen 2. When the processor 4 receives the touch signal on the screen 2, the processor 4 may turn on the fingerprint detection component 3 and the fingerprint detection component 3 can detect the fingerprint data of the user's finger. Thus, there is no need for the user to put his finger on the region over the fingerprint detection component 3 again.

According to an embodiment, the fingerprint detection component 3 can be a bar-type fingerprint identification component, and the bar-type fingerprint identification component can be parallel with the lower edge of the screen 2.

In the embodiment, the fingerprint detection component 3 is a bar-type fingerprint identification component. It is easier for the bar-type fingerprint identification component to be close to an edge of the screen 2. When the fingerprint detection component 3 is in a turn on state and a user is performing fingerprint identification, the user may put his/her finger on a region over the bar-type fingerprint identification component for a period of time, for example two seconds. The bar-type fingerprint identification component detects fingerprint data and sends the fingerprint data to the processor 4. The bar-type fingerprint identification component may be disposed at the central position of the lower edge of the screen 2, and disposed as parallel with the lower edge of the screen 2. Because of a small size of the fingerprint detection component 3, when a user puts his/her finger on the region over the fingerprint detection component 3, a part of the finger may touch the screen 2. When the processor 4 receives a touch signal on the screen 2, it may turn on the fingerprint detection component 3 and the fingerprint detection component 3 can start to detect fingerprint data.

According to an embodiment, the processor 4 is configured to: when a touch signal on a preset screen region of the screen 2 which is adjacent to the fingerprint detection component 3 is received, turn on the fingerprint detection component 3.

Figure 3:
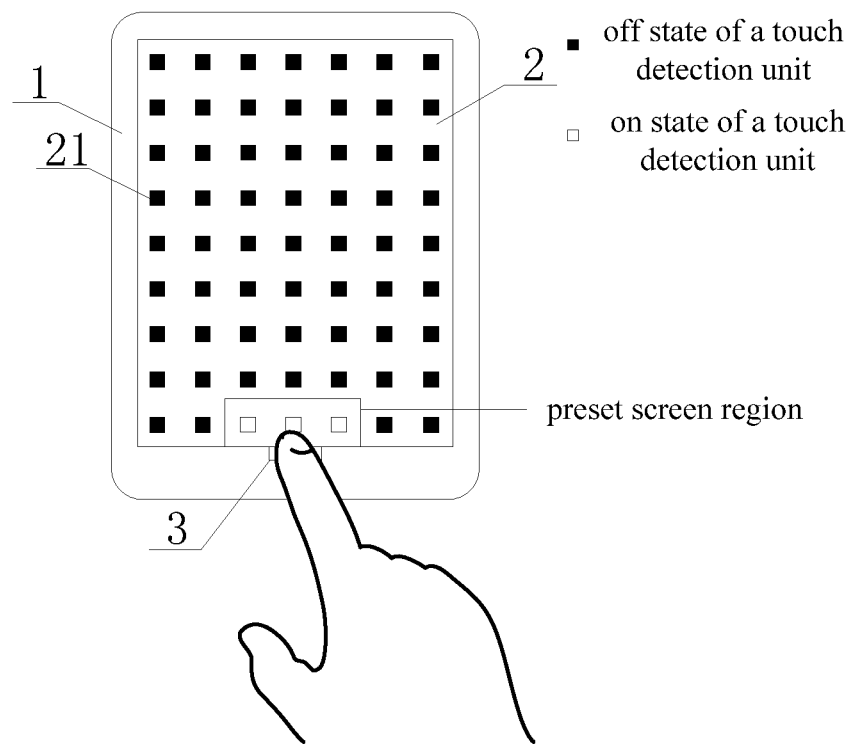
FIG. 3 is a schematic diagram showing a terminal having a fingerprint identification function according to an exemplary embodiment.

In the embodiment, as shown in FIG. 3, the preset screen region may be a preset range of region adjacent to the fingerprint detection component 3. Only when the processor 4 receives a touch signal on this region of the screen 2, the processor 4 controls to turn on the fingerprint detection component 3, and the processor 4 will not turn on the fingerprint detection component 3 if the processor 4 receives a touch signal on other regions of the screen 2.

The processor 4 may be electrically connected to the fingerprint identification component 3 and the screen 2. When a user taps the screen 2, a tap instruction is detected by the screen 2 and the screen 2 sends a touch signal to the processor 4. When the touch signal is received, the processor 4 determines whether the touch signal is a touch signal on the preset screen region. If the touch signal is a touch signal on the preset screen region, the processor 4 sends a turn-on instruction to the fingerprint detection component 3 to turn on the fingerprint detection component 3. In this way, it prevents turning on the fingerprint detection component 3 due to inadvertent touch on the screen. For example, the fingerprint detection component 3 is adjacent to the central position of the lower edge of the screen 2, the preset screen region may be a rectangular region having a length of 1.5 cm and a width of 1 cm. Only when the processor 4 receives a touch signal on the rectangular region, the processor 4 sends the turn-on instruction to the fingerprint detection component 3 to turn on the fingerprint detection component 3, and meanwhile a fingerprint unlock interface is displayed on the interface of the screen 2.

According to an embodiment, the preset control instruction can be a screen unlock instruction, and the processor 4 is further configured to: when the screen 2 is in a sleep mode, turn on one or more touch detection units 21 in the preset screen region of the screen 2 which is adjacent to the fingerprint detection component 3 and turn off one or more touch detection units 21 in other region of the screen than the preset screen region.

In an embodiment, if the processor 4 determines that the similarity between the obtained fingerprint data and the reference data is within the preset similarity range and detects that the present state of the terminal is a screen lock state, then the preset control instruction may be a screen unlock instruction and the processor 4 may execute a screen unlock process.

The screen 2 may further include one or more touch detection units 21 which are electrically connected to the processor 4 and may be configured to detect the touch signal of a user. When the processor 4 detects that the screen 2 is in a sleep mode, all of the touch detection units 21 in the screen 2 are turned on, and the processor 4 may send a turn-off instruction to one or more touch detection units 21 in other region of the screen 2 than the preset screen region. After receiving the turn-off instruction, the one or more touch detection units 21 in the other region of the screen are turned off. In this way, the one or more touch detection units 21 in the region of the screen 2 which can trigger turning on the fingerprint detection component 3 are set to be an on state, and the one or more touch detection units 21 in the region of the screen 2 which cannot trigger turning on the fingerprint detection component 3 are set to be an off state. Thus the power consumption of the screen 2 and thereby the power consumption of the terminal can be reduced.

According to an embodiment, the processor 4 is configured to: when a sliding touch signal on the screen 2 is detected, turn on the fingerprint detection component 3.

Figure 4:
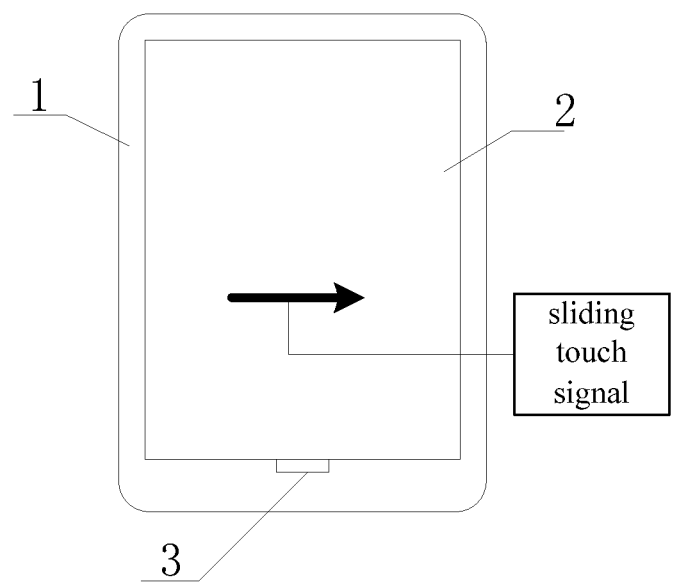
FIG. 4 is a schematic diagram showing a terminal having a fingerprint identification function according to an exemplary embodiment.

In an embodiment, as shown in FIG. 4, the touch signal on the screen 2 may be a sliding touch signal. When a user's finger slides on the screen 2, a sliding touch signal is detected by one or more touch detection units 21 in the screen 2, and the sliding touch signal is sent to the processor 4. When receiving the sliding touch signal, the processor 4 sends a turn-on instruction to the fingerprint detection component 3 to turn on the fingerprint detection component 3, and meanwhile a fingerprint unlock interface is displayed on an interface of the screen 2.

According to an embodiment, the processor 4 may determine whether to turn on the fingerprint detection component 3 according to an ending position of the sliding touch signal. For example, when a sliding touch signal on the screen 2 is detected and an ending position of the sliding touch signal matches a target position, the processor 4 turns on the fingerprint detection component 3. The target position is a preset position which is adjacent to the fingerprint detection component 3.

Figure 5:
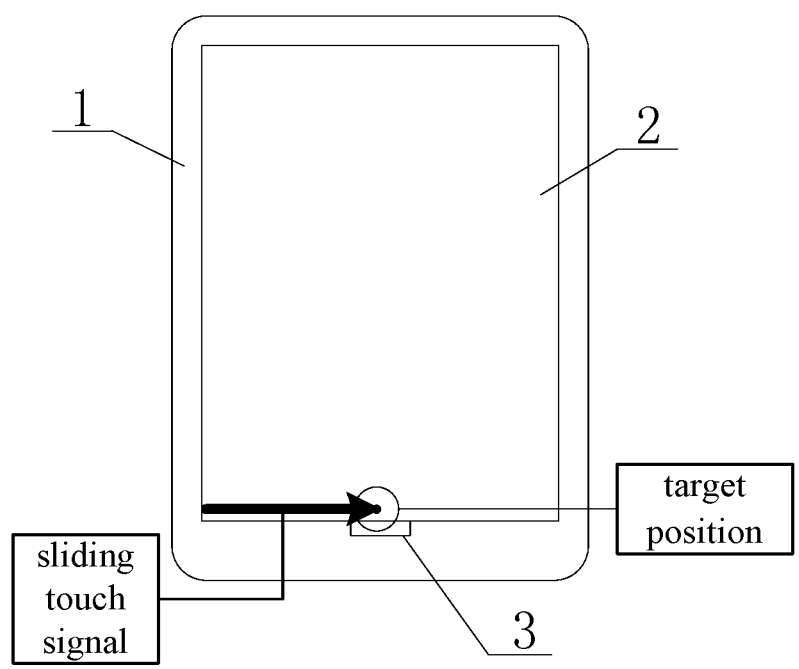
FIG. 5 is a schematic diagram showing a terminal having a fingerprint identification function according to an exemplary embodiment.

In an embodiment, as shown in FIG. 5, the touch signal may be a sliding touch signal which can trigger turning on the fingerprint detection component 3. A target position of the sliding touch signal may be preset and can be stored in the processor 4. Because the fingerprint detection component 3 is adjacent to the lower edge of the screen 2, in order to facilitate the user's operations, the target position may be set as a preset position on the screen 2 which is adjacent to the fingerprint detection component 3, for example, the central position of the lower edge of the screen 2. When a finger of a user slides from any position on the screen 2 to the target position, a sliding touch signal is detected by the screen 2 and is transmitted to the processor 4. When receiving the sliding touch signal, the processor 4 calculates the distance between the ending position of the sliding touch signal and the target position. If the distance is within a preset distance range, such as less than 0.5 mm, the processor 4 determines that the ending position of the sliding touch signal matches the target position and sends a turn-on instruction to the fingerprint detection component 3 to turn on the fingerprint detection component 3, and meanwhile a fingerprint unlock interface is displayed on the interface of the screen 2.

Moreover, the processor 4 may further determine whether to turn on the fingerprint detection component 3 according to the starting position and the ending position of the sliding touch signal. Specifically, if a sliding touch signal on the screen 2 is received and the starting position and the ending position of the sliding touch signal match a target starting position and a target ending position respectively, the processor 4 turns on the fingerprint detection component 3. For example, the target starting position can be the leftmost of the lower edge of the screen 2, and the target ending position can be a preset position on the screen 2 which is adjacent to the fingerprint detection component 3.

The target starting position and the target ending position may be preset and may be stored in the processor 4. If the processor 4 detects that the screen 2 is in a sleep mode, the processor 4 may turn on one or more touch detection units 21 which are in a region of a certain width between the target starting position and the target ending position on the screen 2, and the one or more touch detection units 21 which are in other region of the screen 2 are turned off. Thus, the power consumption of the screen 2 can be reduced. If a finger of a user slides from the leftmost of the lower edge of the screen 2 to the target ending position, a sliding touch signal is detected by the screen 2 and is transmitted to the processor 4. When receiving the sliding touch signal, the processor 4 calculates the distance between the starting position and the target starting position as well as the distance between the ending position and target ending position, and determines whether the foregoing distances are within a preset range (or preset ranges). If the distances are within the preset range (or preset ranges), the processor 4 sends a turn-on instruction to the fingerprint detection component 3 to turn on the fingerprint detection component 3, and wakes up the screen 2 at the same time and displays a fingerprint unlock interface on the interface of the screen 2.

According to an embodiment, the processor 4 is further configured to: after execution of the preset control instruction is completed, turn off the fingerprint detection component 3. Alternatively, the processor is configured to when duration of turning on the fingerprint detection component 3 reaches a preset duration threshold value, turn off the fingerprint detection component 3. Alternatively, the processor is further configured to when the touch signal disappears, turn off the fingerprint detection component 3.

In an embodiment, after receiving information which indicates that the execution of the preset control instruction is completed, the processor 4 can send a turn-off instruction to the fingerprint detection component 3. After receiving the turn-off instruction, the fingerprint detection component 3 itself turns off the power. Thus, the power consumption of the fingerprint detection component 3 and thereby the power consumption of the terminal can be reduced. For example, after receiving the information which indicates that the execution of unlock of the screen 2 is completed, the processor 4 sends a turn-off instruction to the fingerprint detection component 3, and after receiving the turn-off instruction, the fingerprint detection component 3 turns off its power.

Alternatively, when the processor 4 detects that the duration of turning on the fingerprint detection component 3 reaches a preset duration threshold value, such as 5 seconds, the processor 4 sends a turn-off command to the fingerprint detection component 3. After receiving the turn-off instruction, the fingerprint detection component 3 turns off its power. For example, when the processor 4 receives fingerprint data from the fingerprint detection component 3, the processor 4 determines that the similarity between the obtained fingerprint data and reference fingerprint data is not within a preset similarity range, and detects that the duration of turning on the fingerprint detection component 3 has reached 5 seconds, the processor 4 sends a turn-off command to the fingerprint detection component 3. After receiving the turn-off instruction, the fingerprint detection component 3 turns off its power.

Alternatively, when the fingerprint detection component 3 is in a turn-on state, if the processor 4 does not receive any touch signals in a preset period of time, such as 3 seconds, the processor 4 determines that turning on the fingerprint detection component 3 is triggered by an inadvertent touch, and sends a turn-off command to the fingerprint detection component 3. After receiving the turn-off instruction, the fingerprint detection component 3 turns off its power. For example, when the fingerprint detection component 3 is in a turn-on state and the processor 4 does not receive any touch signals in 3 seconds, the processor 4 sends a turn-off command to the fingerprint detection component 3. After receiving the turn-off instruction, the fingerprint detection component 3 turns off its power.

According to an embodiment, the processor 4 is further configured to: after execution of the preset control instruction is completed, control the fingerprint detection component 3 to enter into a sleep mode. Alternatively, when duration of turning on the fingerprint detection component 3 reaches a preset duration threshold value, the processor 4 is configured to control the fingerprint detection component 3 to enter into the sleep mode. Alternatively, when the touch signal disappears, the processor 4 is configured to control the fingerprint detection component 3 to enter into the sleep mode.

In an embodiment, after receiving information which indicates that the execution of the preset control instruction is completed, the processor 4 sends a sleep instruction to the fingerprint detection component 3. After receiving the sleep instruction, the fingerprint detection component 3 switches from a working mode into a sleep mode (i.e., the fingerprint detection function is turned off while the power is not turned off). Thus, the power consumption of the fingerprint detection component 3 and thereby the power consumption of the terminal can be reduced. For example, when the processor 4 receives information which indicates that the execution of unlock of the screen 2 is completed, the processor 4 sends a sleep instruction to the fingerprint detection component 3. After receiving the sleep instruction, the fingerprint detection component 3 turns off the fingerprint detection function without the power off, and then enters into the sleep mode.

Alternatively, when the processor 4 detects that duration of turning on the fingerprint detection component 3 reaches a preset duration threshold value, such as 5 seconds, the processor 4 sends a sleep instruction to the fingerprint detection component 3. After receiving the sleep instruction, the fingerprint detection component 3 turns off the fingerprint detection function without the power off, and then enters into the sleep mode.

Alternatively, when the processor 4 does not receive any touch signals in a preset period of time, such as 3 seconds, the processor 4 determines that turning on of the fingerprint detection component 3 is triggered by an inadvertent touch, and sends a sleep command to the fingerprint detection component 3. After receiving the sleep instruction, the fingerprint detection component 3 turns off the fingerprint detection function without the power off, and then enters into the sleep mode.

In the embodiments of the present disclosure, the terminal includes a body, a screen, a fingerprint detection component and a processor, the screen and the fingerprint detection component are disposed on an outside surface of the body, the processor is disposed inside the body and electrically connected to the screen and the fingerprint detection component; the processor is configured to turn on the fingerprint detection component to obtain fingerprint data detected by the fingerprint detection component when a touch signal on the screen is received. If the fingerprint data matches pre-stored reference fingerprint data, the processor is configured to execute a preset control instruction. In this way, a touch on the screen will trigger to turn on the fingerprint detection component. Thus, it is not needed for the fingerprint detection component with high power consumption to be in the turn-on state all the time, and thereby the power consumption of the terminal can be reduced.

Other embodiments will be apparent to those skilled in the art from consideration of the specification and practice of the embodiments disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A terminal having a fingerprint identification function, comprising:
   a body having an outside surface;
   a screen disposed on the outside surface;
   a fingerprint detection component disposed on the outside surface and adjacent to the screen;
   a processor disposed inside the body and electrically connected to the screen and the fingerprint detection component, wherein the processor is configured to perform the following steps when the screen is in a sleep mode:
   switching the fingerprint detection component from a power-off or sleep mode to a working mode to obtain fingerprint data detected by the fingerprint detection component when a sliding touch signal on the screen is detected and a first distance between a start position of the sliding touch signal and a preset target start position on the screen and a second distance between an ending position of the sliding touch signal and a preset target end position on the screen both fall within a preset distance range; and
   unlocking the screen if the fingerprint data detected by the fingerprint detection component matches pre-stored reference fingerprint data;
   wherein a fingerprint detection area formed by the fingerprint detection component is not overlapping with the screen, and the preset target end position is adjacent to the fingerprint detection component;
   wherein the processor is further configured to control the fingerprint detection component to enter into the sleep mode after unlocking of the screen is completed.

2. The terminal according to claim 1, wherein the fingerprint detection component is disposed adjacent to an edge of the screen.

3. The terminal according to claim 2, wherein the fingerprint detection component is disposed adjacent to a lower edge of the screen.

4. The terminal according to claim 3, wherein the fingerprint detection component is a bar-type fingerprint detection component.

5. The terminal according to claim 4, wherein the bar-type fingerprint detection component is parallel with the lower edge of the screen.

6. The terminal according to claim 2, wherein the processor is configured to turn on the fingerprint detection component when a touch signal on a preset screen region which is adjacent to the fingerprint detection component is received.

* * * * *